Patented Jan. 9, 1923.

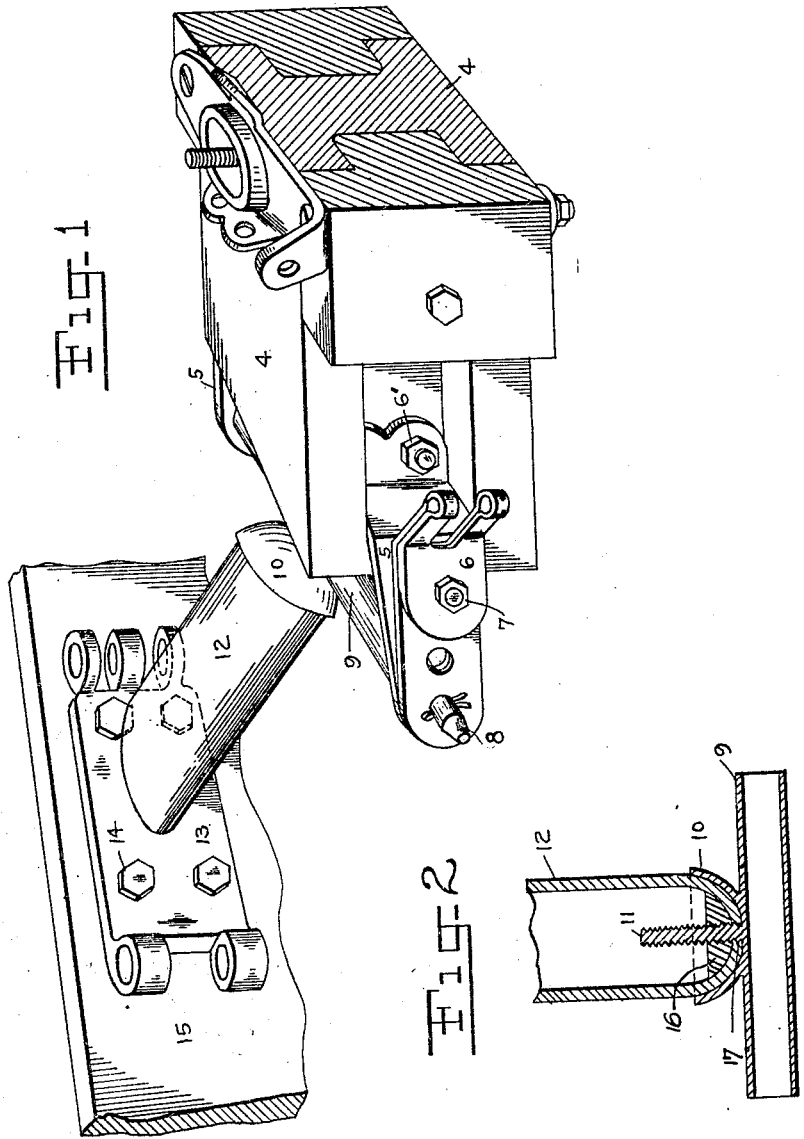

1,441,319

UNITED STATES PATENT OFFICE.

CHARLES F. WILLARD, OF NEW YORK, N. Y., ASSIGNOR, BY MESNE ASSIGNMENTS, TO L.-W.-F ENGINEERING COMPANY, INC., OF COLLEGE POINT, LONG ISLAND, NEW YORK, A CORPORATION OF NEW YORK.

WING CONNECTION FOR AEROPLANES.

Application filed October 18, 1916. Serial No. 126,283.

*To all whom it may concern:*

Be it known that I, CHARLES F. WILLARD, a citizen of the United States, residing at the borough of Manhattan, in the county and State of New York, have invented a new and useful Wing Connection for Aeroplanes, of which the following is a specification.

The invention comprises a connection to be used between the wing and fuselage of an aeroplane or for similar purposes, which is so constructed as to permit the parts to be connected, to be set at the selected or desired angular relation to each other.

Another object is to produce a connection of such structure that it may be modified or adapted to be used in connection with different aeroplanes in which the angular relation desired to be maintained between the wing and fuselage, is different.

Another object is to produce a connection of the above nature permitting pivotal movement between the wing and fuselage of the aeroplane.

Further objects and advantages of the invention will be in part obvious and in part specifically pointed out in the description hereinafter contained, in which is disclosed one form of the invention, which form however is to be considered merely as illustrative of its principle.

In the drawings:

Fig. 1 is a perspective view of the invention with certain parts appearing in section.

Fig. 2 is a cross sectional view showing the details of certain parts of the present form of the invention.

Referring to Fig. 1 of the drawings, the invention as therein shown is used to connect a wing beam 4 to the body or fuselage 15 of an aeroplane. In the present form, a base plate 13 is suitably secured to the fuselage as by means of bolts 14, and carries a post 12 which projects toward the position in which the wing beam 4 is to be secured. A bearing member or socket 10 is suitably secured to the wing beam 4 (preferably by a pivotal connection later to be described) and the spherical engaging surfaces on the members 10 and 12 permit one member to assume many different angular positions with regard to the other. In the present form, the socket or bearing member 10 is provided with a projecting threaded stud 11 which projects through a hole 17 in the post 12 and thus determines the angular position of the bearing member 10 with regard to the spherical surface of the end of post 12. Nut 16 within post 12 is then threaded on to stud 11 to hold the socket 10 firmly in position.

In practice, the hole 17 is drilled in the post so as to maintain the stud 11, and therefore the aeroplane wing at the desired angle to the longitudinal axis of the fuselage, which angular relation obviously will be effected when the connection is assembled. If a different angular relation is desired, a new hole 17 may be drilled, or a post 12 substituted which has such hole properly located. In this way what may be termed a standard connection is produced, in which the parts of machines of a given type will all be assembled at the proper angle, and yet the same form of connection may be used to effect different angles between the parts.

In order to permit pivotal movement between the wing beam and the fuselage, the socket or bearing member 10 is preferably journaled on a pin 8 extending through a sleeve 9, mounted upon the wing beam 4. In the present instance, such wing beam is made of I-beam form, except that the side grooves are not continued to the end of the beam, whereby pockets are formed in which brackets 5, for supporting the pin 8, may be conveniently received. Suitable means such as bolt 6' extending through the brackets 5 and wing beam 4, holds the plates 5 in place. Suitable supplemental brackets 6 may also be mounted respectively on the brackets 5 and held in place as by a bolt 7, the pivot pin 8 passing through such latter brackets as well as the brackets 5.

While a specific form of the invention has been described, it is obvious that many changes may be made without departing from the spirit of the invention, as defined in the following claims.

I claim:—

1. A coupling of the class described comprising a base having a projection with spherically rounded end, means adapted to secure the same upon the body of an aeroplane, a pivotal bearing carrying a socket and adapted to be located at the wing-end and means for securing said projection within the socket and upon said pivotal bearing.

2. A coupling of the class described comprising a plate and a projection therefrom having a rounded end, brackets adapted to be secured to the wing of an aeroplane, a pin connecting said brackets and a sleeve upon said pin, a screw projecting from said sleeve and adapted to penetrate the rounded end of said projection and means for securing the same therein.

3. A wing connection for aeroplanes comprising members pivotally connected together and adapted to be secured to an aeroplane wing, a base adapted to be secured to the aeroplane body, and a connecting means between said base and said pivotal members adapted to effect any kind of angular relation between the same.

4. A wing connection for aeroplanes comprising members adapted to be secured to an aeroplane body and wing, and a connecting means between said members adapted to be rigidly secured in any kind of angular relation between the same.

5. A wing connection for aeroplanes comprising members adapted to be secured to an aeroplane body and wing, and a separate intermediate connecting means between said members adapted to be rigidly secured in a selected angular relation between the same, said connecting means also permitting pivotal movement between said intermediate member and said wing.

6. A wing connection for aeroplanes comprising members adapted to be secured to an aeroplane body and wing and a connecting means between said members comprising a projection fitting within a cup shaped body adapted to be secured in any angular relation between the same.

7. A wing connection for aeroplanes comprising members secured in an aeroplane body and wing and connecting means between said members capable of pivotal or swinging movement in a plane, and adapted to be positioned in any angular direction.

8. A wing connection for aeroplanes comprising members secured in an aeroplane body and wing and connecting means between said members comprising a pivoted part on one member adapted to be secured in any angular relation with respect to the other member.

9. A wing connection for aeroplanes comprising a base on an aeroplane body provided with a projection, brackets on opposite sides of the wing beam carrying a pivot member, a cup shaped socket on the above member adapted to be secured at any angular relation to the said projection.

In testimony whereof I hereunto affix my signature in the presence of two witnesses.

CHARLES F. WILLARD.

Witnesses:
ANNA F. DUFFY,
THOMAS A. HILL.